(12) United States Patent
Nevraev et al.

(10) Patent No.: US 10,650,566 B2
(45) Date of Patent: May 12, 2020

(54) MULTIPLE SHADER PROCESSES IN GRAPHICS PROCESSING

(71) Applicant: Microsoft Technology Licensing, LLC, Redmond, WA (US)

(72) Inventors: Ivan Nevraev, Redmond, WA (US); Martin J. I. Fuller, Warwick (GB); Adam J. Miles, Reading (GB); Jason M. Gould, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 15/639,527

(22) Filed: Jun. 30, 2017

(65) Prior Publication Data
US 2018/0232936 A1    Aug. 16, 2018

Related U.S. Application Data

(60) Provisional application No. 62/459,468, filed on Feb. 15, 2017.

(51) Int. Cl.
*G06T 15/00* (2011.01)
*G06T 15/80* (2011.01)
*G06T 1/60* (2006.01)
*G06T 11/40* (2006.01)
*G06T 1/20* (2006.01)

(52) U.S. Cl.
CPC .............. *G06T 15/005* (2013.01); *G06T 1/20* (2013.01); *G06T 1/60* (2013.01); *G06T 11/40* (2013.01); *G06T 15/80* (2013.01); *G06T 2210/52* (2013.01)

(58) Field of Classification Search
CPC combination set(s) only.
See application file for complete search history.

(56) References Cited

U.S. PATENT DOCUMENTS

| 7,502,035 B1 * | 3/2009 | Moreton ............... G06T 15/503 345/611 |
| 8,081,184 B1 * | 12/2011 | Nordquist ............. G06T 15/005 345/426 |
| 8,743,117 B2 | 6/2014 | Redshaw |
| 9,177,351 B2 | 11/2015 | Goel et al. |
| 9,530,245 B2 | 12/2016 | Frascati et al. |
| 2006/0055695 A1 | 3/2006 | Abdalla et al. |

(Continued)

OTHER PUBLICATIONS

"International Search Report and Written Opinion Issued in PCT Application No. PCT/US2018/017141", dated Apr. 24, 2018, 12 Pages.

(Continued)

*Primary Examiner* — Michael Le
(74) *Attorney, Agent, or Firm* — Arent Fox LLP

(57) ABSTRACT

Methods and devices for rendering graphics in a computer device include receiving, at a graphics processing unit (GPU), a memory location address of a portion of a primitive to be rendered along with an indication of one or more values of one or more pixel shader parameters for the portion of the primitive, selecting, by the GPU, a pixel shader from a plurality of possible pixel shaders based on the indication of the one or more values of the one or more pixel shader parameters, and generating, by the GPU, at least one output of a render target of the portion of the primitive based on applying the pixel shader to the portion of the primitive.

18 Claims, 8 Drawing Sheets

(56) References Cited

U.S. PATENT DOCUMENTS

| | | | |
|---|---|---|---|
| 2006/0082593 A1 | 4/2006 | Stevenson et al. | |
| 2007/0091089 A1 | 4/2007 | Jiao et al. | |
| 2007/0159488 A1* | 7/2007 | Danskin | G06T 15/005 345/505 |
| 2008/0012874 A1 | 1/2008 | Spangler et al. | |
| 2013/0265307 A1 | 10/2013 | Goel et al. | |
| 2014/0118369 A1* | 5/2014 | Hakura | G06T 17/20 345/522 |
| 2014/0176547 A1* | 6/2014 | Duluk, Jr. | G06T 15/005 345/426 |
| 2015/0287230 A1 | 10/2015 | Cerny | |
| 2015/0287240 A1 | 10/2015 | Janczak et al. | |
| 2016/0048999 A1* | 2/2016 | Patney | G06T 15/80 345/426 |

OTHER PUBLICATIONS

Sun, et al., "Interactive Relighting of Dynamic Refractive Objects", In Journal of ACM Transactions on Graphics, vol. 27, No. 3, Article 35, Aug. 2008., 10 pages.

* cited by examiner

MULTIPLE SHADER PROCESSES IN GRAPHICS PROCESSING

CLAIM OF PRIORITY UNDER 35 U.S.C. § 119

The present application for patent claims priority to Provisional Application No. 62/459,468, entitled "MULTIPLE SHADER PROCESSES IN GRAPHICS PROCESSING" filed Feb. 15, 2017, which is assigned to the assignee hereof and hereby expressly incorporated by reference herein for all purposes.

BACKGROUND

The following descriptions relate to a computer device, and more particularly, to using shaders in rendering graphics on a computer device.

Computer graphics systems, which can render two-dimensional (2D) objects or objects from a three-dimensional (3D) world (real or imaginary) onto a 2D display screen, are currently used in a wide variety of applications. For example, 3D computer graphics can be used for real-time interactive applications, such as video games, virtual reality, scientific research, etc., as well as off-line applications, such as the creation of high resolution movies, graphic art, etc. Typically, the graphics system includes a graphics processing unit (GPU). A GPU may be implemented as a co-processor component to a central processing unit (CPU) of the computer, and may be provided in the form of an add-in card (e.g., video card), co-processor, or as functionality that is integrated directly into the motherboard of the computer or into other devices, such as a gaming device.

Typically, the GPU has a "logical graphics pipeline," which may accept as input some representation of a 2D or 3D scene and output a bitmap that defines a 2D image for display. For example, the DIRECTX collection of application programming interfaces by MICROSOFT CORPORATION, including the DIRECT3D application programming interface (API), is an example of APIs that have graphic pipeline models. Another example includes the Open Graphics Library (OPENGL) API. The graphics pipeline typically includes a number of stages to convert a group of vertices, textures, buffers, and state information into an image frame on the screen. For instance, one of the stages of the graphics pipeline is a shader. A shader is a piece of code running on a specialized processing unit, also referred to as a shader unit or shader processor, usually executing multiple data threads at once, programmed to generate appropriate levels of color and/or special effects to fragments being rendered. In particular, for example, a vertex shader processes traits (position, texture coordinates, color, etc.) of a vertex, and a pixel shader processes traits (texture values, color, z-depth and alpha value) of a pixel. Typically, a constant sampling rate within the graphics pipeline is used for rendering an entire frame. Because of the desire for high-fidelity images, pixel shading is typically performed at a per-pixel rate. Thus, the computer device operates the graphics pipeline to convert information about 3D objects into a bitmap that can be displayed, and this process requires considerable memory and processing power.

There are continuing increases in pixel density and display resolution, and a continuing desire for power reduction in display devices capable of displaying 3D objects in this regard.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

One example relates to a method for rendering graphics in a computer device, a computing device, and/or computer-readable medium configured to receive, at a graphics processing unit (GPU), a memory location address of a portion of a primitive to be rendered along with an indication of one or more values of one or more pixel shader parameters for the portion of the primitive, select, by the GPU, a pixel shader from a plurality of possible pixel shaders based on the indication of the one or more values of the one or more pixel shader parameters, and generate, by the GPU, at least one output of a render target of the portion of the primitive based on applying the pixel shader to the portion of the primitive.

In another example, a computing device is provided that includes a memory, a processor coupled to the memory and configured to execute instructions corresponding to one or more applications, a display for displaying one or more images produced by the one or more applications, and a GPU configured to render one or more primitives of the one or more images. The GPU is configured to receive a memory location address of a portion of a primitive of the one or more primitives to be rendered along with an indication of one or more values of one or more pixel shader parameters for the portion of the primitive, select a pixel shader from a plurality of possible pixel shaders based on the indication of the one or more values of the one or more pixel shader parameters, and generate at least one output of a render target of the portion of the primitive based on applying the pixel shader to the portion of the primitive.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
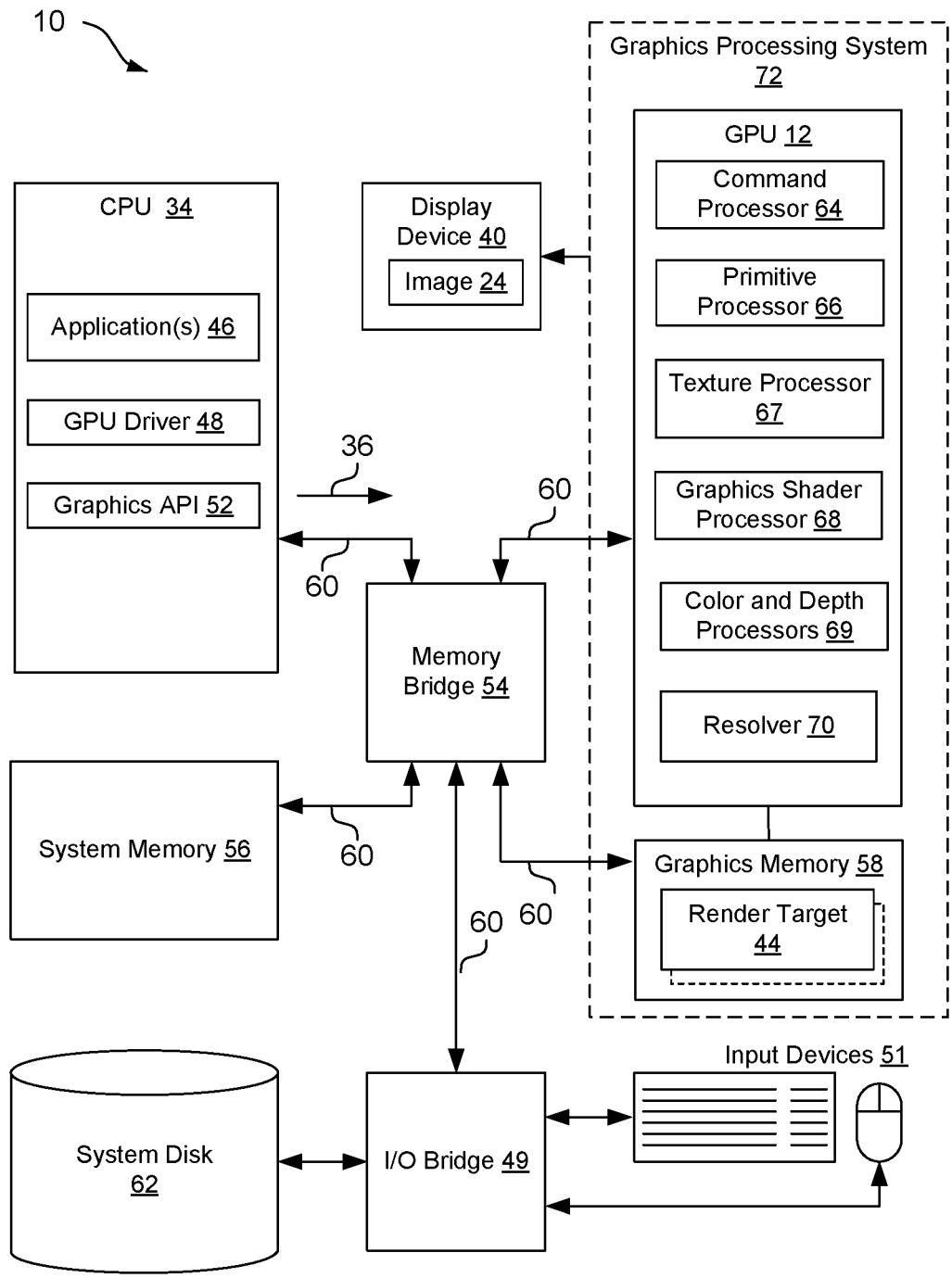
FIG. 1 is a schematic block diagram of an example architecture of a computer device including a graphics processing unit and a graphics pipeline configured according to the described examples.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing multiple shader processes for a given fragment (e.g., tile, sub-tile, quad, pixel, or sub-pixel region) of a rasterized (scan converted) primitive used to render an image (a portion thereof), along with a selector to select one of the multiple shader processes for performing a shading operation on the fragment. In another example, more than one of the multiple shader processes can be used to produce a plurality of render targets of the fragment (which may be combined to produce a single render target). For example, a graphical processing unit (GPU) can provide the multiple shader processes, the selector, a mechanism for generating multiple outputs to a render target, etc., for rendering an image, composed of multiple fragments, to a display.

In one example, a mesh shader (which may be part of a rasterizer stage, as described further herein) may operate to execute one or more thread vectors, each of which can include a plurality of lanes (e.g., threads) for independent or parallel execution (e.g., 64 lanes in some examples). In this example, the mesh shader may launch a pixel shader to operate on each of the plurality of lanes to provide substantially simultaneous shading of a plurality of pixels of the primitive, where the pixel shader can, in each lane, execute (e.g., concurrently) the same instructions for shading different sets of one or more pixels.

The mesh shader, in an example, may be capable of providing different pixel shader parameter values for portions of a given primitive. For example, the different pixel shader parameter values may include a variable rate shading parameter, such that different shading rates (e.g., 1 pixel per pixel shader thread, 2 pixels per pixel shader thread, 4 pixels per pixel shader thread, etc.) can be applied for different portions of a given primitive. In another example, the different pixel shader parameter values may include different stencil values from a stencil buffer that can be used to determine pixel values, etc.

Accordingly, for a given primitive, or other fragment of an image, the mesh shader can pack one or more thread vectors, which can each correspond to a portion of the fragment of the image, such as a coarse tile of 32×32 pixels, a tile of 8×8 pixels, a sub-tile of 4×4 pixels, etc.), where the lanes of a given thread vector are determined to have the same pixel shader settings. The mesh shader can accordingly launch the corresponding pixel shader(s) for performing a pixel shader process at the one or more thread vectors based on the pixel shader settings. The mesh shader can accordingly launch different pixel shaders, and corresponding processes, for different sets of thread vectors based on the pixel shader settings. Additionally, in an example, the mesh shader can launch multiple orthogonal pixel shaders, with different pixel shader settings, per primitive and/or image, which can improve efficiency in performing shading of the primitive by allowing dynamic adaptation and multiple execution of the pixel shaders.

In another example, multiple pixel shading processes may be performed for a given portion of the primitive to generate multiple outputs to a render target of the portion of the primitive. For instance, the mesh shader may launch the multiple pixel shader processes by launching multiple pixel shaders for the portion of the primitive (e.g., in substantially parallel execution), where each of the multiple pixel shaders can obtain the same portion of the primitive as input, but may perform different shading processes based on different pixel shader parameters, which may include different shading rates, stencils, etc., to generate the multiple outputs to the render target for the portion of the primitive. In another example, the mesh shader may launch a single pixel shader capable of generating the multiple outputs to the render target for the portion of the primitive. In this example, the pixel shader can obtain the portion of the primitive as input, and then may perform different pixel shader processes (e.g., in serial execution, and corresponding to different pixel shader parameters) on the input to achieve the multiple outputs. In an example, the multiple outputs may then be used to generate a render target (e.g., based on a mask specifying which output to use for a given portion of the render target.

Referring to FIG. 1, in one example, a computer device 10 includes a graphics processing unit (GPU) 12 configured to implement the described examples of providing for multiple shader processes. For example, GPU 12 can be configured to, for a given primitive, portion thereof, associated image, etc., pack thread vectors for processing with similar pixel shader parameters, select pixel shaders for the thread vectors based on pixel shader parameters, launch multiple pixel shaders based on the selected pixel shaders to process the thread vectors, perform multiple shading process for a primitive, or portion thereof, to produce multiple outputs to a render target, and/or the like.

For example, in one implementation, computer device 10 includes a CPU 34, which may be one or more processors that are specially-configured or programmed to control operation of computer device 10 according to the described examples. For instance, a user may provide an input to computer device 10 to cause CPU 34 to execute one or more software applications 46. Software applications 46 that execute on CPU 34 may include, for example, but are not limited to, one or more of an operating system, a word processor application, an email application, a spread sheet application, a media player application, a video game application, a graphical user interface application or another program. Additionally, CPU 34 may include a GPU driver 48 that can be executed for controlling the operation of GPU 12. The user may provide input to computer device 10 via one or more input devices 51 such as a keyboard, a mouse, a microphone, a touch pad or another input device that is coupled to computer device 10 via an input/output bridge 49, such as but not limited to a southbridge chipset or integrated circuit.

The software applications 46 that execute on CPU 34 may include one or more instructions that executable to cause CPU 34 to issue one or more graphics commands 36 to cause the rendering of graphics data associated with an image 24 on display device 40. The image 24 may comprise, for example, one or more objects, and each object may comprise one or more primitives, as explained in more detail below. For instance, in some implementations, the software application 46 places graphics commands 36 in a buffer in the system memory 56 and the command processor 64 of the GPU 12 fetches them. In some examples, the software instructions may conform to a graphics application programming interface (API) 52, such as, but not limited to, a DirectX and/or Direct3D API, an Open Graphics Library (OpenGL®) API, an Open Graphics Library Embedded Systems (OpenGL ES) API, an X3D API, a RenderMan API, a WebGL API, or any other public or proprietary standard graphics API. In order to process the graphics rendering instructions, CPU 34 may issue one or more graphics commands 36 to GPU 12 (e.g., through GPU driver 48) to cause GPU 12 to perform some or all of the rendering of the graphics data. In some examples, the graphics data to be rendered may include a list of graphics primitives, e.g., points, lines, triangles, quadrilaterals, triangle strips, etc.

Computer device 10 may also include a memory bridge 54 in communication with CPU 34 that facilitates the transfer of data going into and out of system memory 56 and/or graphics memory 58. For example, memory bridge 54 may receive memory read and write commands, and service such commands with respect to system memory 56 and/or graphics memory 58 in order to provide memory services for the components in computer device 10. Memory bridge 54 is communicatively coupled to GPU 12, CPU 34, system memory 56, graphics memory 58, and input/output bridge 49 via one or more buses 60. In an example, for example, memory bridge 54 may be a northbridge integrated circuit or chipset.

System memory 56 may store program modules and/or instructions that are accessible for execution by CPU 34 and/or data for use by the programs executing on CPU 34. For example, system memory 56 may store the operating system application for booting computer device 10. Further, for example, system memory 56 may store a window manager application that is used by CPU 34 to present a graphical user interface (GUI) on display device 40. In addition, system memory 56 may store user applications 46 and other information for use by and/or generated by other components of computer device 10. For example, system memory 56 may act as a device memory for GPU 12 (although, as illustrated, GPU 12 may generally have a direct connection to its own graphics memory 58) and may store data to be operated on by GPU 12 as well as data resulting from operations performed by GPU 12. For example, system memory 56 may store any combination of texture buffers, depth buffers, stencil buffers, vertex buffers, frame buffers, or the like. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

Additionally, in an example, computer device 10 may include or may be communicatively connected with a system disk 62, such as a CD-ROM or other removable memory device. System disk 62 may include programs and/or instructions that computer device 10 can use, for example, to boot operating system in the event that booting operating system from system memory 56 fails. System disk 62 may be communicatively coupled to the other components of computer device 10 via input/output bridge 49.

As discussed above, GPU 12 may be configured to perform graphics operations to render one or more render targets 44 (e.g., based on graphics primitives) to display device 40 to form image 24. For instance, when one of the software applications 46 executing on CPU 34 requires graphics processing, CPU 34 may provide graphics commands and graphics data associated with image 24, along with graphics command 36, to GPU 12 for rendering to display device 40. The graphics data may include, e.g., drawing commands, state information, primitive information, texture information, etc. GPU 12 may include one or more processors, including a command processor 64 for receiving graphics commands 36 and initiating or controlling the subsequent graphics processing by at least one primitive processor 66 for assembling primitives, a plurality of graphics shader processors 68 for processing vertex, surface, pixel, and other data for GPU 12, one or more texture processors 67 for generating texture data for fragments or pixels, and one or more color and depth processors 69 for generating color data and depth data and merging the shading output. For example, in an example, primitive processor 66 may implement input assembler and rasterizer stages of a logical graphics pipeline, as is discussed below. GPU 12 may, in some instances, be built with a highly parallel structure that provides more efficient processing of complex graphic-related operations than CPU 34. For example, GPU 12 may include a plurality of processing elements that are configured to operate on multiple vertices or pixels in a parallel manner. The highly parallel nature of GPU 12 may, in some instances, allow GPU 12 to draw graphics image 24, e.g., GUIs and two-dimensional (2D) and/or three-dimensional (3D) graphics scenes, onto display device 40 more quickly than drawing the image 24 directly to display device 40 using CPU 34.

GPU 12 may, in some instances, be integrated into a motherboard of computer device 10. In other instances, GPU 12 may be present on a graphics card that is installed in a port in the motherboard of computer device 10 or may be otherwise incorporated within a peripheral device configured to interoperate with computer device 10. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In an example, GPU 12 may be directly coupled to graphics memory 58. For example, graphics memory 58 may store any combination of index buffers, vertex buffers, texture buffers, depth buffers, stencil buffers, render target buffers, frame buffers, state information, shader resources, constants buffers, coarse SRP maps (e.g., a 2D map of a viewable area at coarse resolution that can be used to look-up an SRP value based on a closest point in the map to the transformed vertex), unordered access view resources, graphics pipeline stream outputs, or the like. As such, GPU 12 may read data from and write data to graphics memory 58 without using bus 60. In other words, GPU 12 may process data locally using storage local to the graphics card, instead of system memory 56. This allows GPU 12 to operate in a more efficient manner by eliminating the need of GPU 12 to read and write data via bus 60, which may experience heavy bus traffic. In some instances, however, GPU 12 may not include a separate memory, but instead may utilize system memory 56 via bus 60. Graphics memory 58 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 34 and/or GPU 12 may store rendered image data, e.g., render targets 44, in a render target buffer of graphic memory 58. It should be noted that the render target buffer also may be an independent memory or may be allocated within system memory 56. GPU 12 may further include a resolver component 70 configured to retrieve the data from a render target buffer of graphic memory 58 and convert multisample data into per-pixel color values to be sent to display device 40 to display image 24 represented by the rendered image data. In some examples, GPU 12 may include a digital-to-analog converter (DAC) that is configured to convert the digital values retrieved from the resolved render target buffer into an analog signal consumable by display device 40. In other examples, GPU 12 may pass the digital values to display device 40 over a digital interface, such as a High-Definition Multi-media Interface (HDMI interface) or a DISPLAYPORT interface, for additional processing and conversion to analog. As such, in some examples, the combination of GPU 12, graphics memory 58, and resolver component 70 may be referred to as a graphics processing system 72.

Display device 40 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display device 40 may be integrated within computer device 10. For instance, display device 40 may be a screen of a mobile telephone. Alternatively, display device 40 may be a stand-alone device coupled to computer device 10 via a wired or wireless communications link. For instance, display device 40 may be a computer monitor or flat panel display connected to a personal computer via a cable or wireless link. In another example, display device 40 (and computer device 10) may be part of a head-mounted display, such as a virtual reality (VR), mixed reality (MR), or augmented reality (AR) device.

According to one example of the described examples, graphic API 52 and GPU driver 48 may configure GPU 12 to execute logical graphics pipeline 14 to perform multiple shader processes, as described herein.

Figure 2:
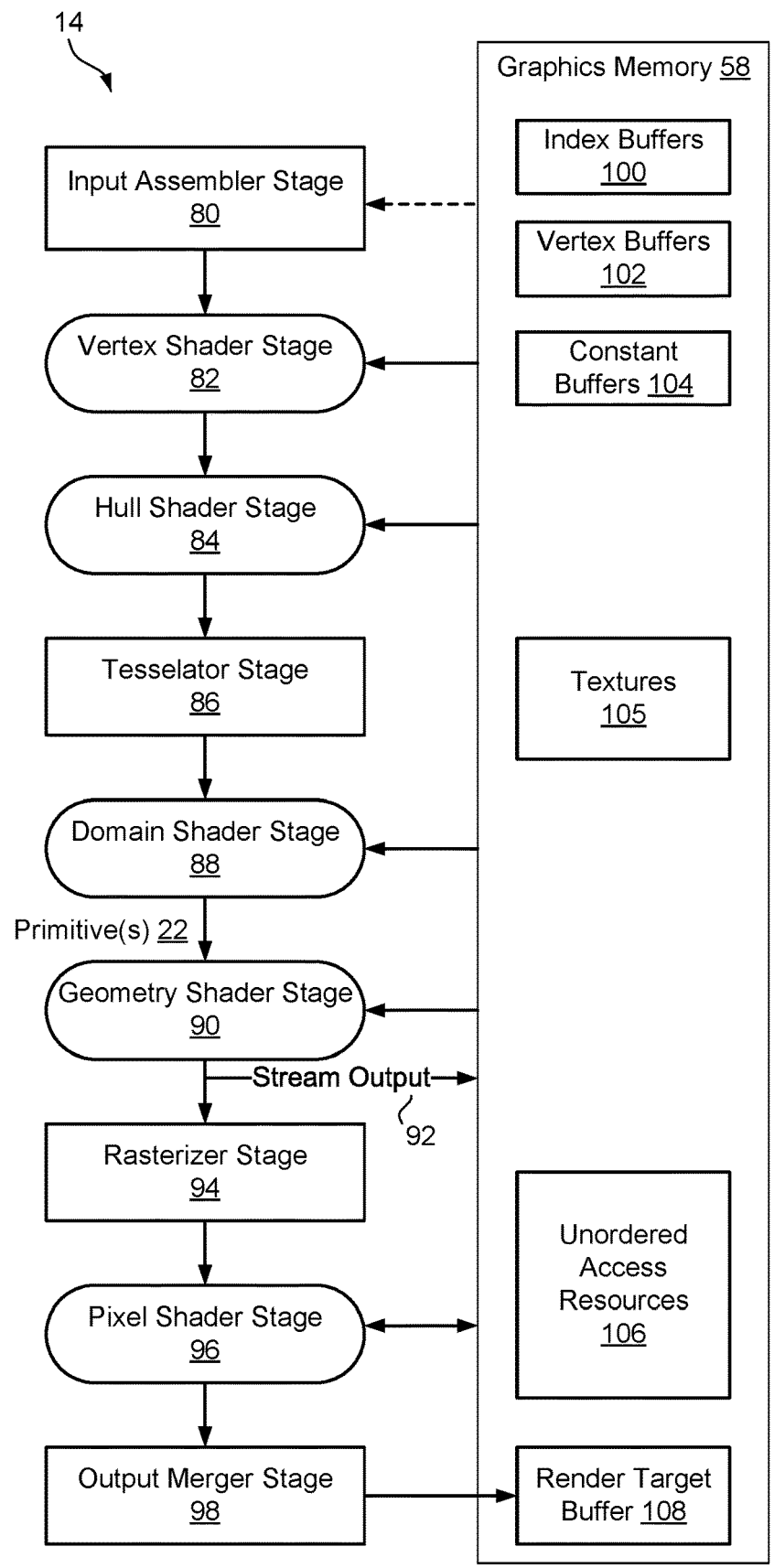
FIG. 2 is a schematic diagram of an example of the graphics pipeline and graphics memory of the computer device of FIG. 1.

Referring to FIG. 2, for instance, in one example, GPU 12 can be configured to implement one or more of the stages of an example logical graphics pipeline 14 as described herein. In an example, one or more of the various stages may be programmable, for instance, to perform multiple shader processes, as described above. Moreover, in an example, common shader cores may be represented by the rounded rectangular blocks. This programmability makes graphics pipeline 14 extremely flexible and adaptable. The purpose of each of the stages is now described in brief below, and additional functionality will be further described with respect to subsequent figures.

The input assembler stage 80 can supply data (e.g., triangles, lines, points, and indexes) to the pipeline, which may be obtained from index buffers 100, vertex buffers 102, etc. The vertex shader stage 82 processes vertices, typically performing operations such as transformations, skinning, and lighting. Vertex shader stage 82 can take a single input vertex and produce a single output vertex. The hull shader stage 84, a tessellator stage 86, and/or a domain-shader 88 stage may define a tessellation stage, which can convert higher-order surfaces to triangles or other primitives 22, for rendering within logical graphics pipeline 14.

The geometry shader stage 90 processes entire primitives 22, and, e.g., in conjunction with rasterizer stage 94 or otherwise, may be referred to as a primitive shader. Its input may be a full primitive 22 (which is three vertices for a triangle, two vertices for a line, or a single vertex for a point, etc.), a quad, or a rectangle. In addition, each primitive can also include the vertex data for any edge-adjacent primitives. This could include an additional three vertices for a triangle or an additional two vertices for a line, etc. The geometry shader stage 90 also supports limited geometry amplification and de-amplification. Given an input primitive 22, the geometry shader can discard the primitive, or emit one or more new primitives.

The stream-output stage 92 streams primitive data from graphics pipeline 14 to graphics memory 58 on its way to the rasterizer stage 94. Data can be streamed out and/or passed into a rasterizer stage 94. Data streamed out to graphics memory 58 can be recirculated back into graphics pipeline 14 as input data or read-back from the CPU 34 (FIG. 1).

The rasterizer stage 94 can clip primitives, prepare primitives for a pixel shader stage 96, and determine how to invoke pixel shaders. Additionally, the rasterizer stage 94 can perform fine scan conversions and determine pixel sample positions covered by the fragments. For example, rasterizer stage 94 can pack one or more thread vectors corresponding to a portion of a primitive, where the one or more thread vectors are determined to be shaded using the same pixel shader parameters. For example, a given thread vector can correspond to a fragment of the primitive (e.g., a coarse tile—32×32 pixels, a tile—8×8 pixels, sub-tile—4×4 pixels, etc.) to be shaded. Accordingly, the rasterizer stage 94 can pack the one or more thread vectors by combining (e.g., in a list) memory location addresses corresponding to the one or more thread vectors that are to be shaded using the same pixel shader parameters along with a corresponding representation of the pixel shader parameters. For example, the representation of the pixel shader parameter(s) may include an interpolation value, an integer value that specifies a variable rate shader (or related parameters for performing variable rate shading, such as a shading rate), a stencil from a stencil buffer used to compute the value, etc. The representation may be referred to herein as a jump table slot value of a jump table slot parameter, from which a pixel shader to be launched (or to which to branch, as described further herein) can be determined.

The pixel shader stage 96 receives interpolated data for primitives and/or fragments, pixel shader settings, etc. and generates per-pixel data, such as color and sample coverage masks. For example, the pixel shader stage 96 can operate a given pixel shader in a plurality of lanes defined by the thread vector to perform a pixel shader process. Moreover, in an example, the pixel shader stage 96 can operate a pixel shader capable of producing multiple outputs of a render target for a given primitive or portion thereof. The pixel shader stage 96 can run as one or more thread vectors, to shade pixels in the memory location addresses, from the graphics memory 58 along with associated pixel shader parameter values (e.g., the jump table slot or otherwise). In this example, the pixel shader stage 96 can initiate one or more pixel shaders to perform pixel shading processes on the pixels in the one or more thread vectors. For example, the pixel shader stage 96 can determine a pixel shader to initiate for a given thread vector or set of thread vectors based on the jump table slot associated with the thread vector, which may be specified by the geometry shader stage 90 (e.g., primitive shader).

For example, pixel shader stage 96 can initialize, based on the corresponding variable rate shader, stencil, etc. indicated by the jump table slot, a pixel shader that can use pixel shader parameter values corresponding to the jump table slot value. The pixel shader stage 96 may initiate a pixel shader for each jump table slot value encountered (e.g., with corresponding pixel shader parameter values). In addition, the pixel shader stage 96 may launch multiple pixel shader processes for a given thread vector or other portion of a primitive to provide multiple outputs to a render target thereof. For example, pixel shader stage 96 can initialize multiple pixel shaders to produce multiple outputs to a render target of the same primitive or portion thereof by using different shading parameters and/or corresponding parameter values (e.g., different shading rates) on the same set of primitive input. In another example, pixel shader stage 96 may initialize a pixel shader capable of producing multiple outputs to a render target of the primitive or portion thereof that is input into the pixel shader, where the multiple outputs are generated by executing different pixel shader processes on the primitive or portion thereof using different pixel shader parameters and/or corresponding parameter values.

The output merger stage 98 combines various types of pipeline output data (pixel shader values, such as the multiple outputs of a single or multiple pixel shaders, depth and stencil information, and coverage masks) with the contents of the render target 44 (FIG. 1) and depth/stencil buffers to generate the final result of graphics pipeline 14.

Also, as discussed above and as illustrated in FIG. 2, graphics pipeline 14 may operate in conjunction with graphics memory 58 for exchanging and storing data. For example, graphics memory 58 can include one or more vertex buffers 102 that each contain the vertex data used to define geometry of image 24 (or other images). Vertex data can include position coordinates, color data, texture coordinate data, normal data, and so on. The simplest example of vertex buffer 102 is one that only contains position data. In an example, vertex buffer 102 can contain data to fully specify 3D vertices. An example of this could be vertex buffer 102 that contains per-vertex position, normal and texture coordinates. This data can be organized as sets of per-vertex elements.

Further, in an example, graphics memory 58 may include one or more index buffers 100, which contain integer offsets into vertex buffers 102 and are used to render primitives 22 more efficiently. Each index buffer 100 can include a sequential set of indices; each index is used to identify a vertex in a vertex buffer.

Also, in an example, graphics memory 58 may include one or more constant buffers 104 that allows an efficient supply of shader constants, shader data, stencils, and/or any other shader resources to graphics pipeline 14. Further, one or more buffers in graphics memory 58 can be used to store the results of the stream-output stage 92. Moreover, graphics memory 58 may include one or more texture buffers or textures data 105, such as bitmaps of pixel colors that give an object the appearance of texture.

Additionally, in an example, graphics memory 58 may include one or more unordered access view resources 106 (which includes buffers, textures, and texture arrays—without multisampling). Unordered access view resources 106 can allow temporally unordered read/write access from multiple threads. In this regard, for example, this resource type can be read/written simultaneously by multiple threads without generating memory conflicts through the use of certain defined functions.

Moreover, in an example, graphics memory 58 may include one or more render target buffers 108, which can include the rendered target or drawing of each pixel 32 of image 24 produced by graphics pipeline 14.

Figure 3:
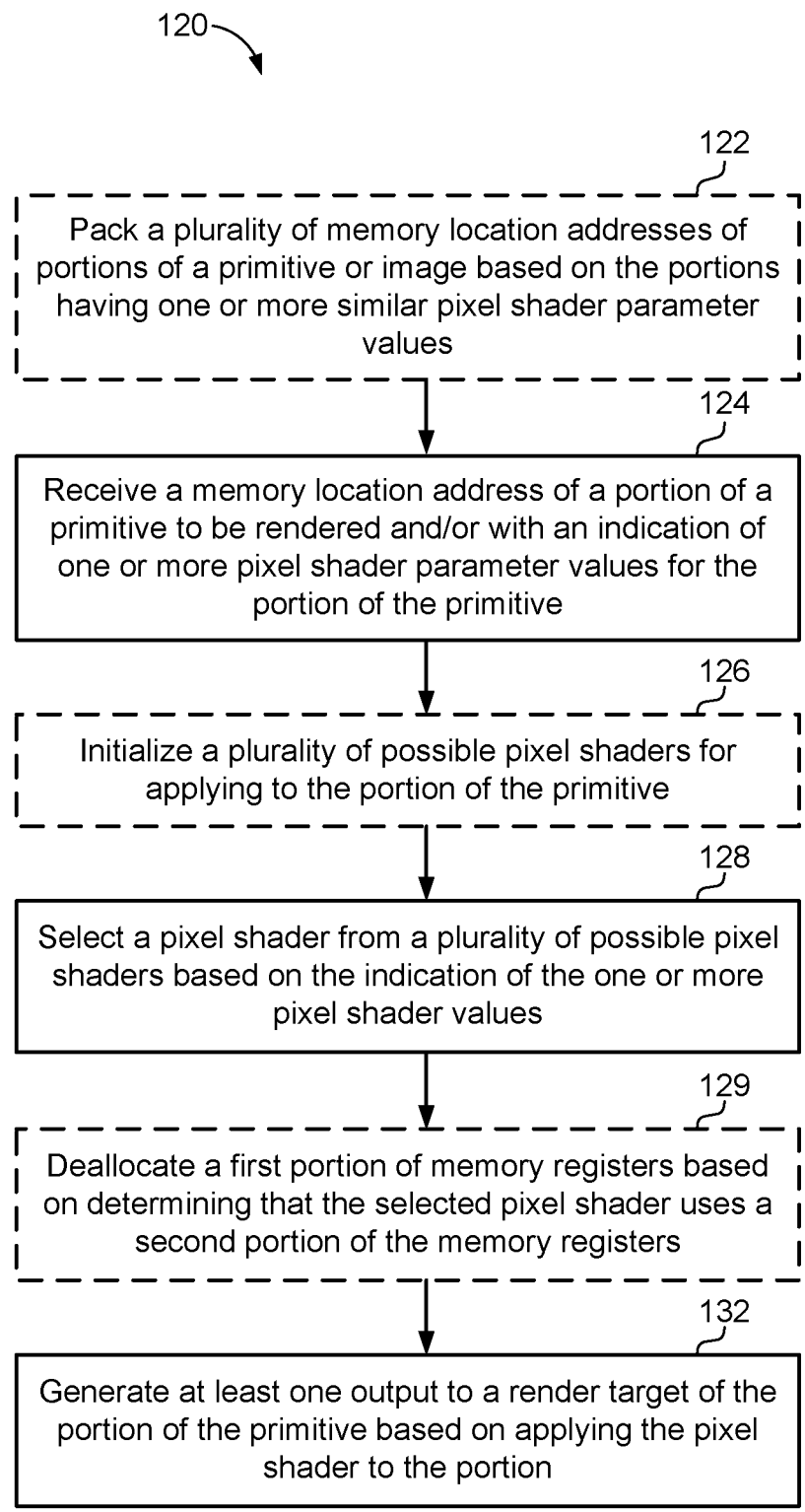
FIG. 3 is a flowchart of an example of a method of rendering an image based on operation of the graphics pipeline according to the described examples.
Figure 4:
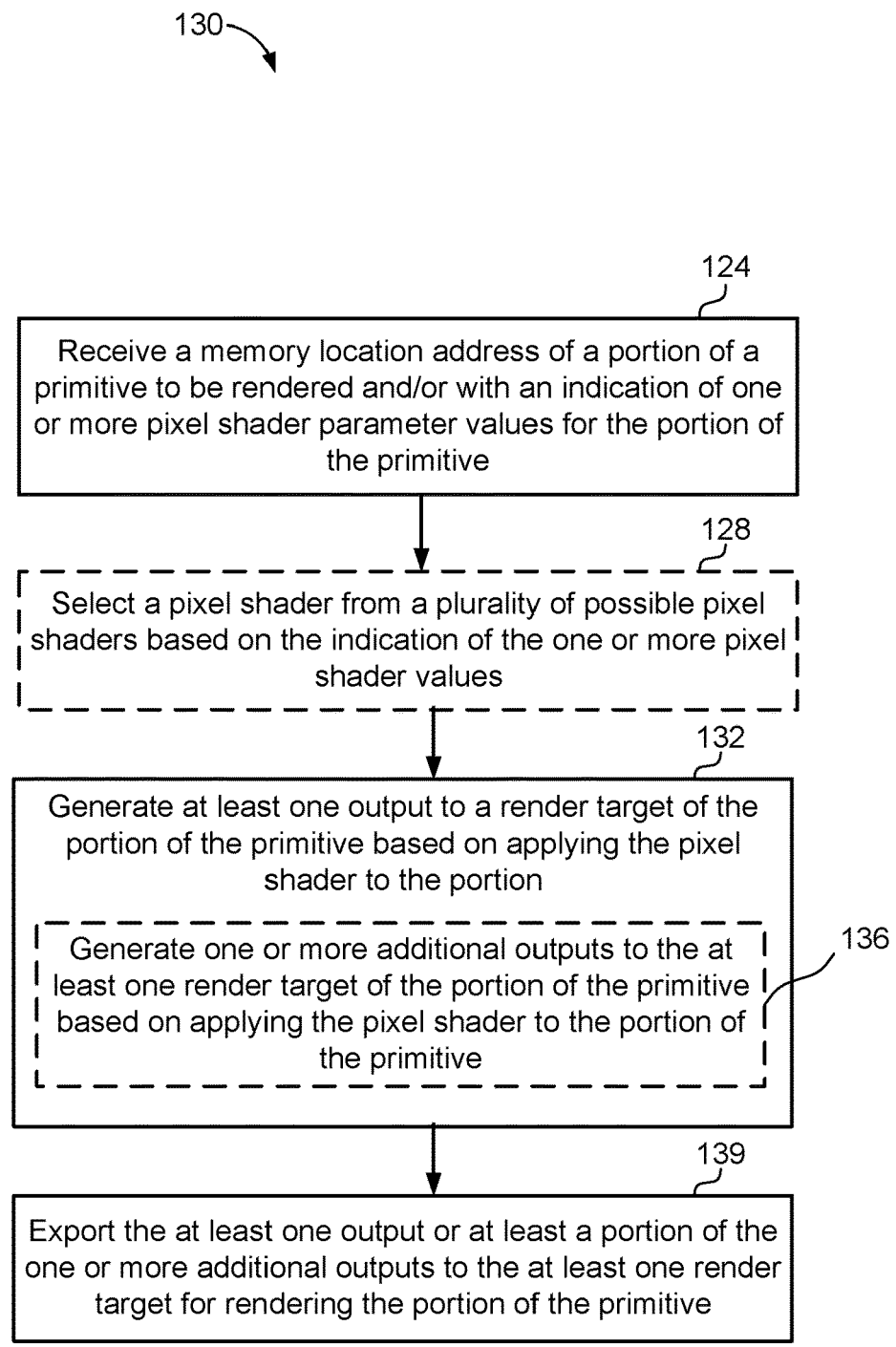
FIG. 4 is a flowchart of an example of a method of rendering an image based on operation of the graphics pipeline to generate multiple outputs to a render target using one pixel shader according to the described examples
Figure 5:
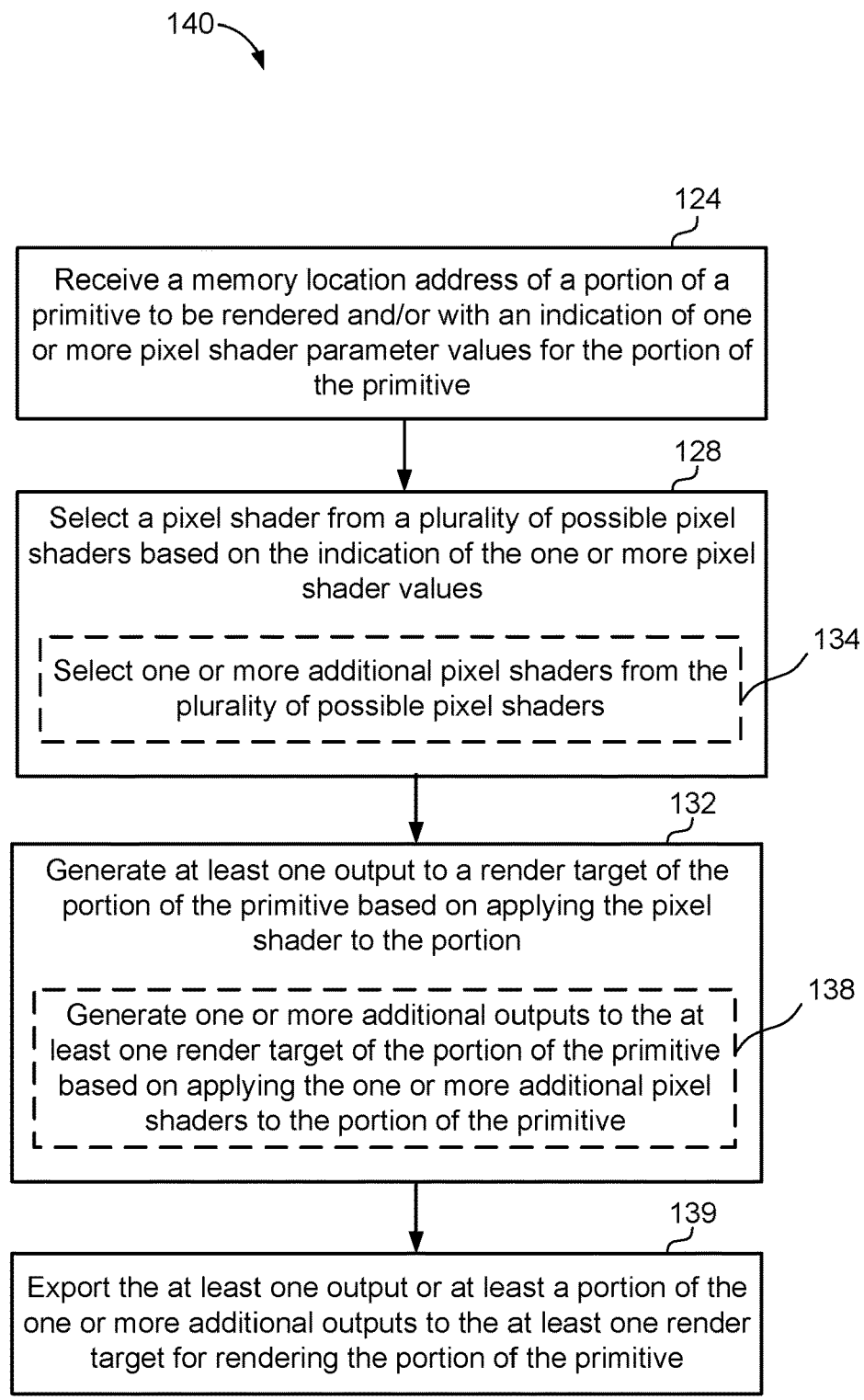
FIG. 5 is a flowchart of an example of a method of rendering an image based on operation of the graphics pipeline to generate multiple outputs to a render target using multiple launched pixel shaders according to the described examples
Figure 6:
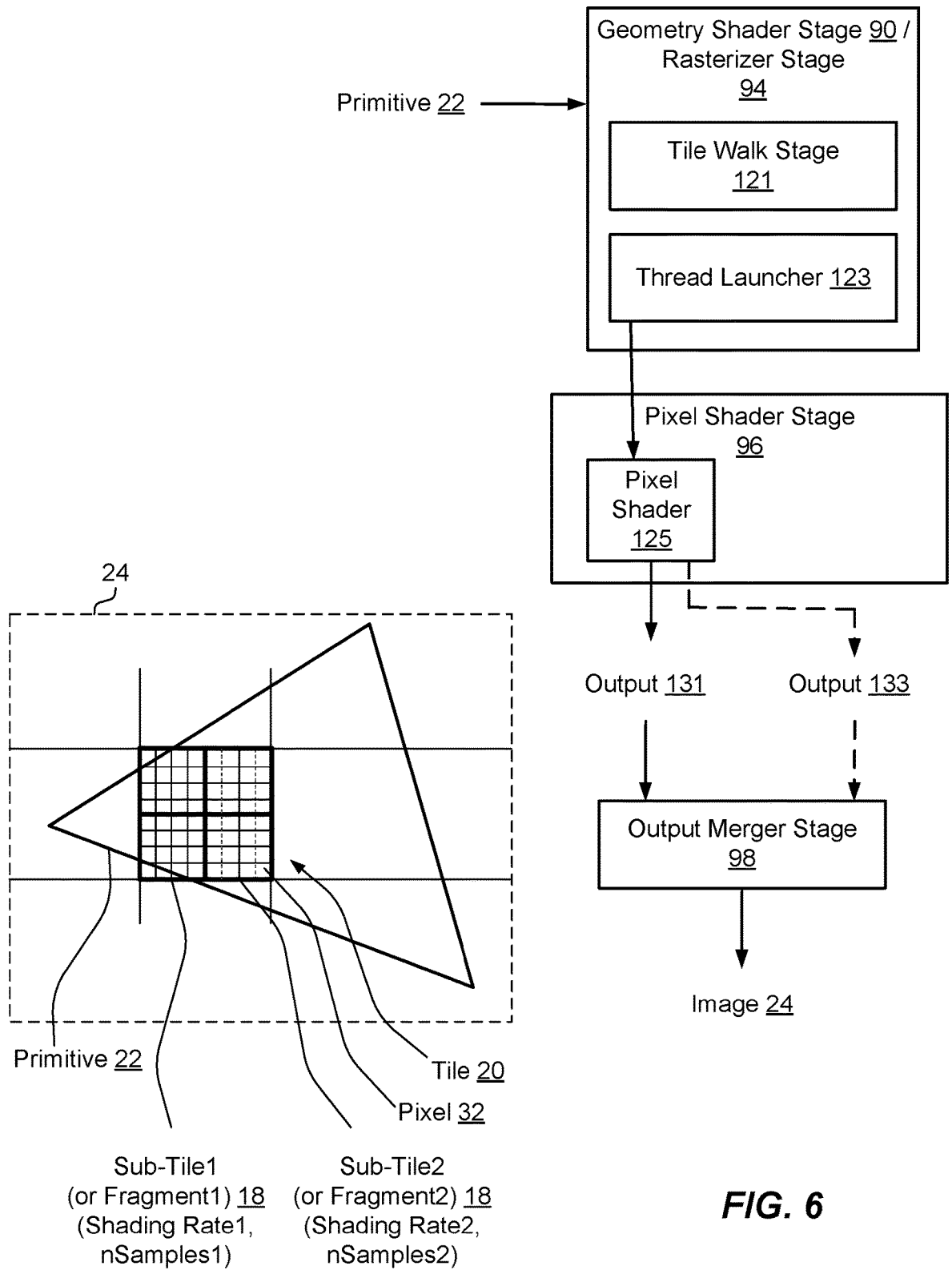
FIG. 6 is a schematic diagram of an example of a primitive of an image, and tiles and sub-tiles covered by the primitive, and an example of components associated with the operations described in the method of FIGS. 3 and/or 4.
Figure 7:
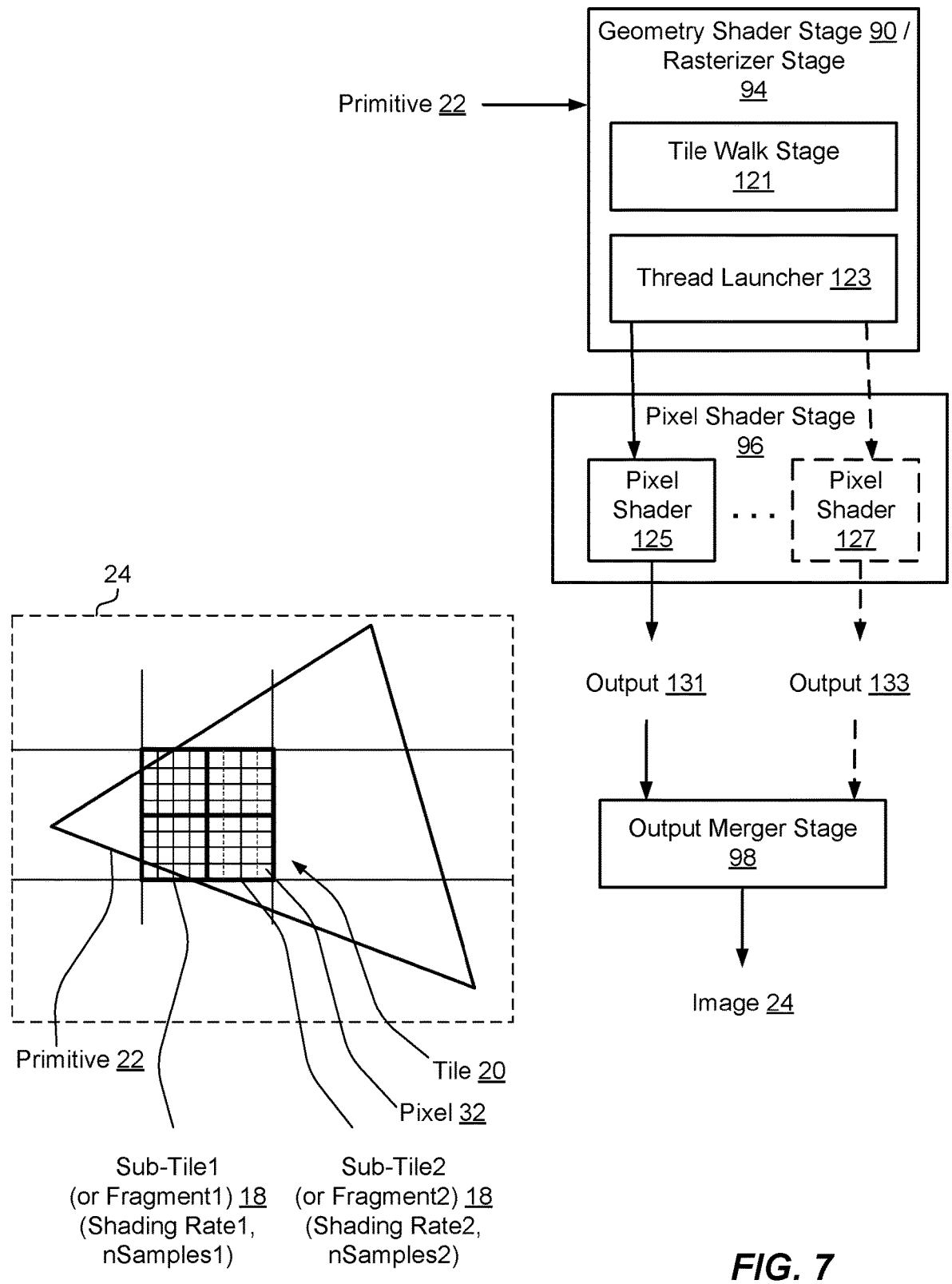
FIG. 7 is a schematic diagram of an example of a primitive of an image, and tiles and sub-tiles covered by the primitive, and an example of components associated with the operations described in the method of FIGS. 3 and/or 5.

Referring to FIGS. 3-7, examples of operating graphics pipeline 14 according to the described examples may be explained with reference to methods 120, 130, and 140 of rendering graphics in FIGS. 3-5, and with reference to image 24, in FIGS. 6 and 7, having one or more primitives 22 covering one or more tiles 20, which may include one or more sub-tiles 18 (e.g., sub-tile1 and sub-tile2) per tile 20 and/or one or more pixels 32, and corresponding components of geometry shader stage 90/rasterizer stage 94 (e.g., a primitive shader). In an example, the one or more primitives 22 can cover one or more tiles, which may include one or more sub-tiles. In one example, a plurality of tiles may cover 32×32 pixels (also referred to as a coarse tile), where each tile can be 8×8 pixels, and a sub-tile can be 4×4 pixels.

Referring to FIGS. 3, 6, and 7, a method 120 of rendering graphics in a computer device relates to selecting a pixel shader from a plurality of pixel shaders that may be initiated for providing shading based on different pixel shader parameter values.

At 122, method 120 optionally includes packing a plurality of memory location addresses of portions of a primitive or image based on the portions having one or more similar pixel shader parameter values. For example, graphics pipeline 14, geometry shader stage 90/rasterizer stage 94, and/or tile walk stage may be configured to pack the plurality of memory location addresses (e.g., in graphics memory 58) of portions of a primitive (e.g., primitive 22) or image based on the portions having one or more similar pixel shader parameter values. For example, tile walk stage 121 may determine pixel shader parameter values for the portion of the primitive 22, where the portion may include one or more tiles 20, sub-tiles 18, etc. The pixel shader parameters, for which the values are determined, can include a shading rate (e.g., such that multiple portions of the primitive, such as coarse tiles, tiles, sub-tiles, etc., may be shaded at a different shading rate), one or more stencils from a stencil buffer for shading the portion of the primitive, etc. Tile walk stage 121 may determine the shading rates, stencils, etc., on a per object basis (e.g., for primitives belonging to an object to be shaded), on a per-triangle basis, based on an optimization for a screen-space region (e.g., for virtual reality displays), etc.

In any case, for example, tile walk stage 121 can associate the portions of the primitive or images with a jump table slot value that represents the one or more pixel shader parameter values. For example, the jump table slot value may include a portion of bits corresponding to a shading rate, a portion of bits corresponding to a stencil to be sourced from a stencil buffer in shading the portion, etc. In one example, the jump table slot can be combined with the memory location address to generate another parameter value that can be provided to the pixel shader stage 96 to allow the pixel shader stage 96 to determine the memory location address for the pixel shader, along with the jump table slot value for selecting an appropriate pixel shader. In a specific example, the bottom 40 bits of the parameter value can include the memory address, and the top 24 bits can include programmable parameters, which can include the jump table slot, which can then be determined by the pixel shader stage 96 by isolating the top 24 bits.

At 124, method 120 includes receiving a memory location address of a portion of a primitive to be rendered and/or an indication of one or more pixel shader parameter values for the portion of the primitive. For example, graphics pipeline 14, geometry shader stage 90/rasterizer stage 94, and/or thread launcher 123 may be configured to receive the memory location address of the portion of the primitive to be rendered and/or (e.g., along with) the indication of the one or more pixel shader parameter values for the portion of the primitive. For example, thread launcher 123 can receive the memory location addresses of one or more portions of the primitive having similar pixel shader parameters (e.g., portions associated with the same jump table slot). In an example, the thread launcher 123 can receive a value indicating the memory location address(es) and corresponding jump table slot value. In one example, the memory location addresses may be part of a list of addresses having similar jump table slot values. In another example, thread launcher 123 can also receive memory location addresses of other portions of the primitive associated with different values for the one or more pixel shader parameters.

At 126, method 120 optionally includes initializing a plurality of possible pixel shaders for applying to the portion of the primitive. For example, graphics pipeline 14, geometry shader stage 90/rasterizer stage 94, and/or thread launcher 123 may be configured to initialize the plurality of possible pixel shaders as a thread group (e.g., to be executed in parallel) for applying the portion of the primitive. In one example, thread launcher 123 may initialize the plurality of possible pixel shaders (e.g., initiated or possibly initiated pixel shaders that may be selected from at 128) to operate based on the associated pixel shader parameter values (e.g., based on all or a portion of possible values of the pixel shader parameters), and may allow for selection of a given pixel shader via a jump table that allows for branching to the pixel shader based on a jump table slot value (e.g., where the jump table slot value corresponds to the pixel shader parameter values, as described). Thus, given a specific jump table slot, one of the initialized plurality of pixel shaders can be selected and branched to, as described in further detail below.

In another example, graphics pipeline 14 may initialize the possible pixel shaders in compilation of the GPU code, and a branch to a pixel shader (e.g., based on selecting the pixel shader as described below in reference to action 128) based on the jump table slot can become a statically linked operation. Thread launcher 123 may also initialize (e.g., allocate) a plurality of memory registers, where the number of memory registers to allocate can be associated with the possible pixel shaders (e.g., a maximum number of memory registers specified by one of the plurality of possible pixel shaders). In any case, this can facilitate variable rate shading at the GPU 12 by allowing the GPU 12 to select one of the plurality of initiated pixel shaders to shade the portion of the primitive. In addition, for example, a number of pixel shaders to launch may be indicated in a register setting of the GPU 12, which can be determined by the thread launcher 123, and accordingly initiated for possible use by pixel shader stage 96 along with corresponding pixel shader parameters values (e.g., shading rate).

At 128, method 120 includes selecting a pixel shader from a plurality of possible pixel shaders based on the indication of the one or more pixel shader values. For example, graphics pipeline 14, geometry shader stage 90/rasterizer stage 94, and/or thread launcher 123 may be configured to select the pixel shader from the plurality of possible pixel shaders based on the indication of the one or more pixel shader values. In one example, thread launcher 123 can launch a pixel shader 125 based on the values of the one or more pixel shader parameter values as indicated (e.g., by the jump table slot), which may include launching pixel shader 125 based on a corresponding shading rate, stencil to be used, etc. In an example, thread launcher 123 can generate a thread vector of a number of instances of the pixel shader 125 for shading the portion of the primitive. Thread launcher 123 may generate a thread vector for each of the portions of the primitive having similar values specified for the one or more pixel shader parameters (e.g., shading rate), such that the pixel shader can be applied to the thread vectors (e.g., as indicated in the received memory location addresses).

In an example, each of the plurality of possible pixel shaders can be defined to correspond to possible values of the one or more pixel shader parameters, and thus thread launcher 123 can determine the pixel shader 125 as one of the plurality of possible pixel shaders having matching values for the parameters. In another example, thread launcher 123 can initialize or select the pixel shader 125 to operate using the values of the pixel shader parameters as specified. Moreover, for example, thread launcher 123 may select the pixel shader by specifying an entry point in GPU code corresponding to the pixel shader associated with the jump table slot value, and can accordingly branch to the associated pixel shader code, and/or may specify the memory location addresses for the pixel shader code. In one example, thread launcher 123 may determine the pixel shader 125 based at least in part on a jump table slot, as described above, which may be included in a parameter value (e.g., as combined with the memory address or otherwise) as output from the geometry shader stage 90/rasterizer stage 94.

In any case, pixel shader selection can be performed by the GPU 12, which may execute code similar to the following in selecting the pixel shader 125 based on the received pixel shader parameter values (e.g., SV_JumpTableSlot):

```
PixelShaderStub(unit slot : SV_JumpTableSlot)
{
    if (slot == 0)
        JumpTo(PixelShaderWithShadows.EntryPoint,
    PixelShaderWithShadows.NumRegisters);
    else
        JumpTo(PixelShaderWithoutShadows.EntryPoint,
    PixelShaderWithoutShadows.NumRegisters);
}
``` where the PixelShaderWithShadows.EntryPoint can be the branch location of one of the pixel shaders 125, PixelShaderWithShadows.NumRegisters can be a number of memory registers (e.g., general purpose registers (GPR)) used for the pixel shader 125, Pixel ShaderWithoutShadows.EntryPoint can be the branch location of the other one of the pixel shaders 127, and PixelShaderWithoutShadows.NumRegisters can be a number of memory registers used for the pixel shader 127.

In another example, the GPU 12 can select one pixel shader at pixel shader stage 96 and can indicate the jump table slot value (or related pixel shader parameter values) to the selected pixel shader. In this example, the compiler can generate code that can statically uniformly branch on the jump table slot value.

At 129, method 120 may optionally include deallocating a first portion of memory registers based on determining that the selected pixel shader uses a second portion of the memory registers. For example, graphics pipeline 14, geometry shader stage 90/rasterizer stage 94, and/or thread launcher 123 may be configured to deallocate the first portion of memory registers (e.g., in graphics memory 58) based on determining that the selected pixel shader uses a second portion of the memory registers. As described, for example, thread launcher 123 may initialize a plurality of possible pixel shaders, which may each specify a different number of memory registers, and thread launcher 123 may accordingly allocate a number of memory registers corresponding to a maximum number specified by one of the possible pixel shaders, as described in reference to action 126 above. Thus, where the selected pixel shader specifies less than the maximum number of registers, thread launcher 123 can deallocate the memory registers not needed for the selected pixel shader to allow the memory registers to be used by another process (e.g., to perform another shading of the same or different portion of the primitive or another primitive).

At 132, method 120 includes generating at least one output to a render target of the portion of the primitive based on applying the pixel shader to the portion. For example, graphics pipeline 14, pixel shader stage 96, pixel shader 125, and/or optional pixel shader 127 can generate the at least one output to the render target 44 of the portion of the primitive (e.g., tile, sub-tile, etc.) based on applying the pixel shader (e.g., pixel shader 125 or 127) to the portion. In an example, the pixel shader 125 or 127 can generate an associated output to the render target 44 by applying the one or more pixel shader parameters (e.g., a shading rate, stencil, etc.) to the portion of the primitive. In one example, as described further herein, pixel shader 125 may be capable of generating multiple outputs 131, 133 to the render target 44 and/or pixel shader stage 96 may launch multiple pixel shaders 125 and 127 (and/or additional pixel shaders), each of which can generate an output 131, 133 to render target 44 for a given portion of the primitive.

Referring to FIGS. 4 and 6, method 130 can include one or more steps of method 120, and some similar steps are shown, but some steps may be omitted for ease of explanation. In particular, in an example, method 130 depicts actions for using a pixel shader to provide multiple outputs, which may or may not use the shader selection steps described in method 120. For example, method 130 may include steps for packing memory location addresses, initializing possible pixel shaders, etc. Method 130 relates to launching a pixel shader to produce multiple outputs to a render target of a portion of a primitive.

At 124, method 130 includes receiving a memory location address of a portion of a primitive to be rendered and/or an indication of one or more pixel shader parameter values for the portion of the primitive. As described in an example, graphics pipeline 14, geometry shader stage 90/rasterizer stage 94, and/or thread launcher 123 may be configured to receive the memory location address of the portion of the primitive to be rendered and/or the indication of the one or more pixel shader parameter values for the portion of the primitive. In one example, thread launcher 123 can receive the memory location addresses of one or more portions of the primitive having similar pixel shader parameters (e.g., portions associated with the same jump table slot), and may receive or otherwise determine multiple values for an associated pixel shader parameter value (e.g., based on receiving multiple jump table slot values or other indications of the values). In another example, thread launcher 123 can receive the pixel shader parameter values (e.g., multiple shading rates) for launching a pixel shader 125 capable of outputting multiple outputs 131, 133 of a render target (e.g., based on the multiple shading rates).

At 128, method 130 optionally includes selecting a pixel shader from a plurality of possible pixel shaders based on the indication of the one or more pixel shader values. For example, graphics pipeline 14, geometry shader stage 90/rasterizer stage 94, and/or thread launcher 123 may be configured to select the pixel shader from the plurality of possible pixel shaders based on the indication of the one or more pixel shader values. In one example, thread launcher 123 can launch a pixel shader 125 based on the multiple values for at least one pixel shader parameter, where the pixel shader 125 can be capable of applying multiple pixel shader processes, based on the multiple pixel shader parameter values, to generate multiple render targets. In an example, as described, thread launcher 123 can generate a thread vector of a number of instances of the pixel shader 125 for shading the portion of the primitive. Thread launcher 123 may generate a thread vector for each of the portions of the primitive having similar values specified for the one or more pixel shader parameters, such that the pixel shader can be applied to the thread vectors (e.g., as indicated in the received memory location addresses) to generate the multiple outputs 131, 133 of the render target 44.

In one example, thread launcher 123 can launch the pixel shader 125 with the multiple pixel shader parameter values, and the pixel shader 125 can generate the corresponding outputs 131, 133 in substantially serial execution. In one example, it may be possible for thread launcher 123 to launch multiple such pixel shaders that each perform multiple shader processes in serial, as described above and further herein. The multiple pixel shaders, in this example (e.g., pixel shaders similar to pixel shaders 125, 127 in FIG. 7, but each pixel shader, or at least one pixel shader, outputting multiple outputs) may be executed in parallel to one another. In this example, and/or other examples, the pixel shader(s) may be selected from the plurality of possible pixel shaders, as described in action 128.

At 132, method 130 includes generating at least one output to a render target of the portion of the primitive based on applying the pixel shader to the portion. As described in an example, graphics pipeline 14, pixel shader stage 96, and/or pixel shader 125 can generate the at least one output to the render target 44 of the portion of the primitive (e.g., tile, sub-tile, etc.) based on applying the pixel shader (e.g., pixel shader 125) to the portion. In an example, the pixel shader 125 can generate multiple outputs 131, 133 associated with render target 44 by applying the multiple pixel shader parameter values (e.g., a shading rate, stencil, etc.) to the portion of the primitive.

In one example, as described, pixel shader 125 may be capable of generating multiple outputs of the render target based on different values for pixel shader parameters (e.g., different shading rates, different stencils, etc.). Thus, generating the at least one render target at 132 may optionally also include, at 136, generating one or more additional outputs to the at least one render target of the portion of the primitive based on applying the pixel shader to the portion of the primitive. For example, graphics pipeline 14, pixel shader stage 96, and/or pixel shader 125 can generate the one or more additional outputs 131, 133 to the at least one render target of the portion of the primitive based on applying the pixel shader 125 to the portion of the primitive using a different value of the multiple values for one or more pixel shader parameters. In this example, the data of the portion of the primitive may be shared in applying the pixel shader 125 using the multiple values of the given pixel shader parameter.

In one example, pixel shader 125 may execute pixel shader processes using varying shading rates to generate the multiple outputs 131, 133 (e.g., a 1×1 pixel shading rate, a 2×1 pixel shading rate, a 1×2 pixel shading rate, a 2×2 pixel shading rate, a 2×4 pixel shading rate, etc.). Thus, for example, pixel shader 125 can output coarse and/or fine shaded portions of a primitive such to provide some areas with specular highlights while providing coarse rate shading for other parts of the primitive.

At 139, method 130 can include exporting the at least one output or at least a portion of the one or more additional outputs to the at least one render target for rendering the portion of the primitive. For example, graphics pipeline 14, pixel shader stage 96, and/or output merger stage 98 can export the at least one output or at least the portion of the one or more additional outputs to the at least one render target for rendering the portion of the primitive. In a specific example, pixel shader 125 can generate multiple outputs 131, 133 of the portion of the primitive having different shading rates (e.g., 1 pixel per lane of a thread vector, 2 pixels per lane of a thread vector, etc.), and all or a portion of one or more of the outputs 131, 133 can be used to generate render target 44 having a desired level of variable shading for the portion of the primitive. In one example, pixel shader stage 96, output merger stage 98, etc. can apply a steering mask to one or more of the outputs to indicate which samples from the outputs used to generate the render target 44 to achieve the desired variable shading. In an example, the steering mask can indicate which samples to export from each output 131, 133 in generating the render target 44 of the portion of the primitive. Additionally, for example, using the steering mask, the pixel shader 125 can output a single value to multiple outputs 131, 133 simultaneously, or output unique values to each output 131, 133, etc.

In one example, pixel shader 125 can generate the output 131 without filling the output 131 with samples that are determined to be provided by the other output 133 (e.g., based on the steering mask), and/or vice versa, such that a fill rate penalty is avoided for each output 131, 133 as the samples that are not to be used can be avoided in generating the outputs 131, 133. Then, in generating the render target 44, the pixel shader stage 96 can appropriately position the samples from the respective outputs 131, 133 for rendering the portion of the primitive, which may be according to a steering mask, as described.

In another example, in generating the render target based on the multiple outputs 131, 133, pixel shader stage 96 and/or output merger stage 98 can generate output 131 using pixel shader 125, and can shade one or more pixels of the render target 44 based on output 131 from pixel shader 125 in generating render target 44, while shading other pixels of the render target 44 based on output 133 from pixel shader 125 (e.g., based on a steering mask indicating which samples should be exported from the output 131 or 133). In another example, pixel shader stage 96 can generate output 131 using pixel shader 125 at a highest shading rate of the specified shading rate parameter, and then may generate additional output 133 at lower shading rates by exporting various outputs of the varying rates based on the render target 44.

In forward rendering, for example, where one render target is rendered at a time, pixel shader 125 can output a value for each sample in a given pixel it has been assigned. In the case of 4× multisample anti-aliasing (MSAA), as described below, there are 4 samples to write for a given pixel. Traditional MSAA may allow for a single color value to be propagated to all 4 samples in the event the pixel is completely covered by a triangle (e.g., as the pixel shader only runs once). By utilizing a pixel shader 125 capable of generating multiple outputs, for example, unique values can be provided to each sample (e.g., each output 131, 133) of a single render target, or, broadcast a single value across all samples. The steering mask can accordingly indicate which samples to use for each export.

This ability to export multiple outputs of a single render target can be compatible with other non-forward rendering techniques as well, which may use multiple render targets, such as deferred rendering. By utilizing a pixel shader 125 capable of generating multiple outputs, for example, a value can be broadcast to all samples of a given render target (e.g., MRT0, which may thus be a lower frequency RT) while also providing unique values per sample to another render target (e.g., MRT1, which may thus be a higher frequency RT). Thus, two (or more) complete render targets of data may be generated by pixel shader 125: one that has unique values per sample (MRT1); and one that has shared/identical values in each sample of the pixel (MRT0). An application, for example, may utilize these MRTs for a desired purpose in rendering an image corresponding to the render targets.

In a specific example of generating deferred gbuffer, for the 4K rendering case when one render target receives shading that is one-half in size across both dimensions, a pixel shader 125 can be used to generate the following outputs (e.g., outputs 131, 133): 1080p MRT0 4×MSAA—low shading rate; 1080p MRT1 4×MSAA—full shading rate; 1080p Depth 4×MSAA—always full rate with full edge resolve. Sample locations of the corresponding render targets may be arranged in a regular grid with sample locations hitting centers of pixels in full resolution. Sample code may be similar to the following:

```
Pixel ShaderTwoLevels (float3 bary, uint coverage)
{
   // Low frequency
   // Compute low res UV coordinate at centroid
   float2 uvLow = EvaluateAtPixelCentroid(bary, coverage);
   // Read low frequency data -- no custom gradients needed here
   float4 lowFreq = t0.Tex2D(uvLow, s0);
   // Export low frequency data to all 4 samples.
   Export(MRT0, lowFreq, RemapOneToAll);
   // Compute high frequency data
   // Compute gradients transform matrix
   uint gradientsMatrix2x2 = ComputeOrLoadGradients( );
   // Compute common per-quad values like N.L
   SharedData sd = ComputeSharedData( );
   // For each high res sample.
   for (int i = 0; i < 4; ++i)
   {
      // Skip completely if not covered
      if (!(coverage & (1 << i))
      {
         continue;
      }
      float2 uvHigh = EvaluateAtSamplePosition(bary, i);
      float4 highFreq = ComputeLighting(uvHigh, sd);
      // Write sample out to MRT1
      Export(MRT1, highFreq, RemapToSampleIndex(i));
   }
}
```

At this point multiple exports to different samples can be performed by writing a sample mask along with the export, as described above.

In another example, for forward rendering (e.g., just one render target), code may be similar to the following to provide outputs 131, 133 of 1080p MRT0 4×MSAA—mixed shading rate, and 1080p Depth 4×MSAA—always full rate with full edge resolve:

```
// Mixed rendering
PixelShaderMixed(float3 bary, uint coverage, uint2 screenSpacePos)
{
    // Choose frequency
    if (screenSpacePos.x > 540 && g_cameraMotionIsVeryHigh)
    {
        // Compute low res UV coordinate at centroid
        float2 uvLow = EvaluateAtPixelCentroid(bary, coverage);
        // Read low frequency data -- no custom gradients needed here
        float4 lowFreq = t0.Tex2D(uvLow, s0);
        // Export low frequency data to all 4 samples.
        Export(MRT0, lowFreq, RemapOneToAll);
        return;
    }
    // Compute high frequency data
    // Compute gradients transform matrix
    uint gradientsMatrix2x2 = ComputeOrLoadGradients( );
    // For each high res sample.
    for (int i = 0; i < 4; ++i)
    {
        // Skip completely if not covered
        if (!(coverage & (1 << i)))
        {
            continue;
        }
        float2 uvHigh = EvaluateAtSamplePosition(bary, i);
        float4 highFreq = ComputeLighting(uvHigh, sd);
        // Write sample out to MRT1
        Export(MRT0, highFreq, RemapToSampleIndex(i));
    }
}
```

In another example, a pixel shader 125 can be written such that it incorporates work that can be done per pixel (logically a quad at full-resolution) with work that can be done per sample (a pixel at full-resolution). For example, code may be similar to the following:

```
// Mixed rendering
PixelShaderMixed(float3 bary, uint coverage, uint2 screenSpacePos)
{
    // Compute low frequency data
    // Compute low res UV coordinate at centroid
    float2 uvLow = EvaluateAtPixelCentroid(bary, coverage);
    // Read low frequency data -- no custom gradients needed here
    float shadowLookup = shadowMap.Tex2D(uvLow, s0);
    float aoLookup = ao.Tex2D(uvLow, s1);
    // Compute high frequency data
    // Compute gradients transform matrix
    uint gradientsMatrix2x2 = ComputeOrLoadGradients( );
    // For each high res sample.
    for (int i = 0; i < 4; ++i)
    {
        // Skip completely if not covered
        if (!(coverage & (1 << i)))
        {
            continue;
        }
        float2 uvHigh = EvaluateAtSamplePosition(bary, i);
        float4 highFreq = ComputeLighting(uvHigh, sd) *
            shadowLookup;
*aoLookup;
        // Write sample out to MRT1
        Export(MRT0, highFreq, RemapToSampleIndex(i));
    }
}
```

To avoid divergence here in situations where no pixel has 4 samples lit up (e.g., activated for shading in 4×MSAA), for example, but within the thread vector all samples are "lit up" by at least one pixel, strategies can be employed to perform the shading in iterations to avoid turning off threads and/or skipping samples. For example, if no thread has any more than 3 lit samples, shading can be performed in 3 iterations to avoid turning off threads skipping that sample.

Additionally, in an example, with support for 8×MSAA the following reductions in shading rate can be supported: output per sample—"Full rate"; output 4 samples out of a possible 8—"Half rate"; output 2 samples out of a possible 8 "Quarter Rate"; and output 1 sample out of a possible 8 "Eighth Rate"

Without MSAA, in an example, the thread launcher 123 can issue thread vectors where one lane corresponding to one full-rate pixel and then reduce thread vector width for the low-res shading rates. This may have the implication that pixel shaders are running at full resolution, and may need to export at full resolution, quarter resolution, eighth resolution, etc. from the same shader, etc. Code for the pixel shader 125, in this example, may be similar to the following:

```
// This is launched at full pixel res
PixelShaderHighToLow(float3 bary, uint coverage)
{
    // Full res
    // Compute full res UV coordinate at centre
    float2 uvHigh = EvaluateAtPixelCentre(bary, coverage);
    // Compute common per-quad values like N.L
    SharedData sd = ComputeSharedData( );
    // Do the lighting, the work is not shared
    float4 highFreq = ComputeLighting(uvHigh, sd);
    // Write sample out to MRT1
    Export(MRT1, highFreq);
    // Now narrow the thread vector to 1/4 size and do low res
    // Quads should be still assigned to their triangles or recombine M0 to
    // compact it.
    // Light up only one pixel per quad
    // Do low frequency work and write it out
}
```

This may be appealing in cases where there is a hardware assist for recombining MRT0 and quads to increase thread vector utilization. For instance, if instructions existed to repack work efficiently when as many thread vectors are not needed, this approach may provide efficiency over multi-cycling outputs.

Referring to FIGS. 5 and 7, method 140 can include one or more steps of method 120, and some similar steps are shown, but some steps may be omitted for ease of explanation. For example, method 140 may include steps for packing memory location addresses, initializing possible pixel shaders, etc. Method 140 relates to launching multiple pixel shaders to produce multiple outputs to a render target of a portion of a primitive.

At 124, method 140 includes receiving a memory location address of a portion of a primitive to be rendered and/or an indication of one or more pixel shader parameter values for the portion of the primitive. As described in an example, graphics pipeline 14, geometry shader stage 90/rasterizer stage 94, and/or thread launcher 123 may be configured to receive the memory location address of the portion of the primitive to be rendered and/or (e.g., along with) the indication of the one or more pixel shader parameter values for the portion of the primitive. For example, thread launcher 123 can receive the memory location addresses of one or more portions of the primitive having similar pixel shader parameters (e.g., portions associated with the same jump table slot), and may receive or otherwise determine multiple values for an associated pixel shader parameter value (e.g., based on receiving multiple jump table slot values or other indications of the values).

At 128, method 140 includes selecting a pixel shader from a plurality of possible pixel shaders based on the indication of the one or more pixel shader values. For example, graphics pipeline 14, geometry shader stage 90/rasterizer stage 94, and/or thread launcher 123 may be configured to select the pixel shader from the plurality of possible pixel shaders based on the indication of the one or more pixel shader values. In an example, selecting the pixel shader at 128 may optionally include, at 134, selecting one or more additional pixel shaders from the plurality of possible pixel shaders. For example, graphics pipeline 14, geometry shader stage 90/rasterizer stage 94, and/or thread launcher 123 may be configured to select the one or more additional pixel shaders 127 from the plurality of possible pixel shaders. For example, the pixel shaders 125, 127 may output multiple outputs 131, 133 of a single render target 44, and the thread launcher 123 may launch multiple pixel shaders 125, 127 (e.g., with different values for one or more pixel shader parameters) to obtain the multiple outputs 131, 133. In one example, pixel shaders 125, 127 can operate concurrently (e.g., in parallel) with one another in generating respective outputs 131, 133.

At 132, method 140 includes generating at least one output to a render target of the portion of the primitive based on applying the pixel shader to the portion. As described in an example, graphics pipeline 14, pixel shader stage 96, pixel shader 125, and/or optional pixel shader 127 can generate the at least one output to the render target 44 of the portion of the primitive (e.g., tile, sub-tile, etc.) based on applying the pixel shader(s) (e.g., pixel shader 125 or 127) to the portion. In an example, the pixel shader 125 or 127 can generate an output 131, 133 associated with render target 44 by each applying the one or more pixel shader parameters (e.g., a shading rate, stencil, etc.) to the portion of the primitive.

In one example, is selecting the pixel shader and one or more additional pixel shaders, pixel shader stage 96 may launch multiple pixel shaders 125 and 127 (and/or additional pixel shaders, not shown), each of which can generate an output 131, 133 to a render target for a given portion of the primitive based on different values for pixel shader parameters (e.g., different shading rates, different stencils, etc.). For example, pixel shader 125 can shade the portion of the primitive at one shading rate to generate output 131, and pixel shader 127 (e.g., in parallel with pixel shader 125) can shade the portion of the primitive at another shading rate to generate output 133. Thus, generating the at least one render target at 132 may optionally include, at 136, generating one or more additional outputs to the at least one render target of the portion of the primitive based on applying the one or more additional pixel shaders to the portion of the primitive. For example, graphics pipeline 14, pixel shader stage 96, and/or optional pixel shader 127 can generate the one or more additional outputs 133 to the at least one render target of the portion of the primitive based on applying the one or more additional pixel shaders 127 to the portion of the primitive using a different value for one or more pixel shader parameters. As similarly described above, for example, pixel shader 125 can output coarse shaded portions of a primitive and/or pixel shader 127 can output fine shaded portions of the primitive such to provide some areas with specular highlights while providing coarse rate shading for other parts of the primitive.

At 139, method 140 can include exporting the at least one output or at least a portion of the one or more additional outputs to the at least one render target for rendering the portion of the primitive. For example, graphics pipeline 14, pixel shader stage 96, and/or output merger stage 98 can export the at least one output or at least the portion of the one or more additional outputs to the at least one render target for rendering the portion of the primitive. In a specific example, pixel shaders 125, 127 can generate multiple outputs 131, 133 of the portion of the primitive having different shading rates (e.g., 1 pixel per lane of a thread vector, 2 pixels per lane of a thread vector, etc.), and all or a portion of one or more of the outputs 131, 133 can be used to generate render target 44 having a desired level of variable shading for the portion of the primitive. In one example, pixel shader stage 96, output merger stage 98, etc. can apply a steering mask to one or more of the outputs to indicate which samples from the outputs used to generate the render target 44 to achieve the desired variable shading. In an example, the steering mask can indicate which samples to export from each output 131, 133 in generating the render target 44 of the portion of the primitive. Additionally, for example, using the steering mask, the pixel shader 125 and/or pixel shader 127 can output a single value to multiple outputs 131, 133 simultaneously, or output unique values to each output 131, 133, etc.

In one example, pixel shader 125 can generate the output 131 without filling the output 131 with samples that are determined to be provided by the other output 133 (e.g., based on the steering mask), and/or vice versa, such that a fill rate penalty is avoided for each output 131, 133 as the samples that are not to be used can be avoided in generating the outputs 131, 133. Then, in generating the render target 44, the pixel shader stage 96 can appropriately position the samples from the respective outputs 131, 133 for rendering the portion of the primitive, which may be according to a steering mask, as described.

In another example, in generating the render target based on the multiple outputs 131, 133, pixel shader stage 96 and/or output merger stage 98 can generate output 131 using pixel shader 125, and can shade one or more pixels of the render target 44 based on output 131 from pixel shader 125 in generating render target 44, while shading other pixels of the render target 44 based on output 133 from pixel shader 127 (e.g., based on a steering mask indicating which samples should be exported from the pixel shader 125 or pixel shader 127). In another example, pixel shader stage 96 can generate output 131 using pixel shader 125 at a highest shading rate of the specified shading rate parameter, and then may generate additional output 133 at lower shading rates by exporting various outputs of the varying rates based on the render target 44 (e.g., output 133 from pixel shader 127).

In forward rendering, for example, where one render target is rendered at a time, pixel shader 125 can output a value for each sample in a given pixel it has been assigned. In the case of 4×MSAA, as described below, there are 4 samples to write for a given pixel. Traditional MSAA may allow for a single color value to be propagated to all 4 samples in the event the pixel is completely covered by a triangle (e.g., as the pixel shader only runs once). By utilizing multiple pixel shaders 125, 127 capable of generating multiple outputs, for example, unique values can be provided to each sample (e.g., each output 131, 133) of a single render target, or, broadcast a single value across all samples. The steering mask can accordingly indicate which samples to use for each export.

This ability to export multiple outputs of a single render target can be compatible with other non-forward rendering techniques as well, which may use multiple render targets, such as deferred rendering. By utilizing multiple pixel shaders 125, 127, for example, a value can be broadcast to all samples of a given render target (e.g., MRT0, which may thus be a lower frequency RT) while also providing unique values per sample to another render target (e.g., MRT1, which may thus be a higher frequency RT). Thus, two (or more) complete render targets of data may be generated by pixel shader 125 and/or pixel shader 127: one that has unique values per sample (MRT1); and one that has shared/identical values in each sample of the pixel (MRT0). An application, for example, may utilize these MRTs for a desired purpose in rendering an image corresponding to the render targets.

In a specific example, the pixel shader stage 96 may expose an API to allow for selection of a pixel shader 125, 127 (and or related pixel shader parameter values) to generate outputs 131, 133. In an example, code for accessing the pixel shader stage 96 to launch the multiple pixel shaders 125, 127 may be similar to the following:

```
PixelShaderLowRate(float2 uvLow)
{
  // Low frequency
  // Read low frequency data -- no custom gradients needed here
  float4 lowFreq = t0.Tex2D(uvLow, s0);
  // Export low frequency data to all 4 samples.
  Export(MRT0, lowFreq);
}
PixelShaderHighRate(float2 uvHigh)
{
    float4 highFreq = ComputeLighting(uvHigh, sd);
    // Write sample out to MRT1
    Export(MRT1, highFreq);
}
```

This technique may work with forward rendering due to the ability to initiate low-resolution and high-resolution pixel shaders. For example, thread launcher 123 can launch a pixel shader thread vector per MRT at a given zoom factor. The outputs 131, 133 of the thread vectors can be joined after execution.

Figure 8:
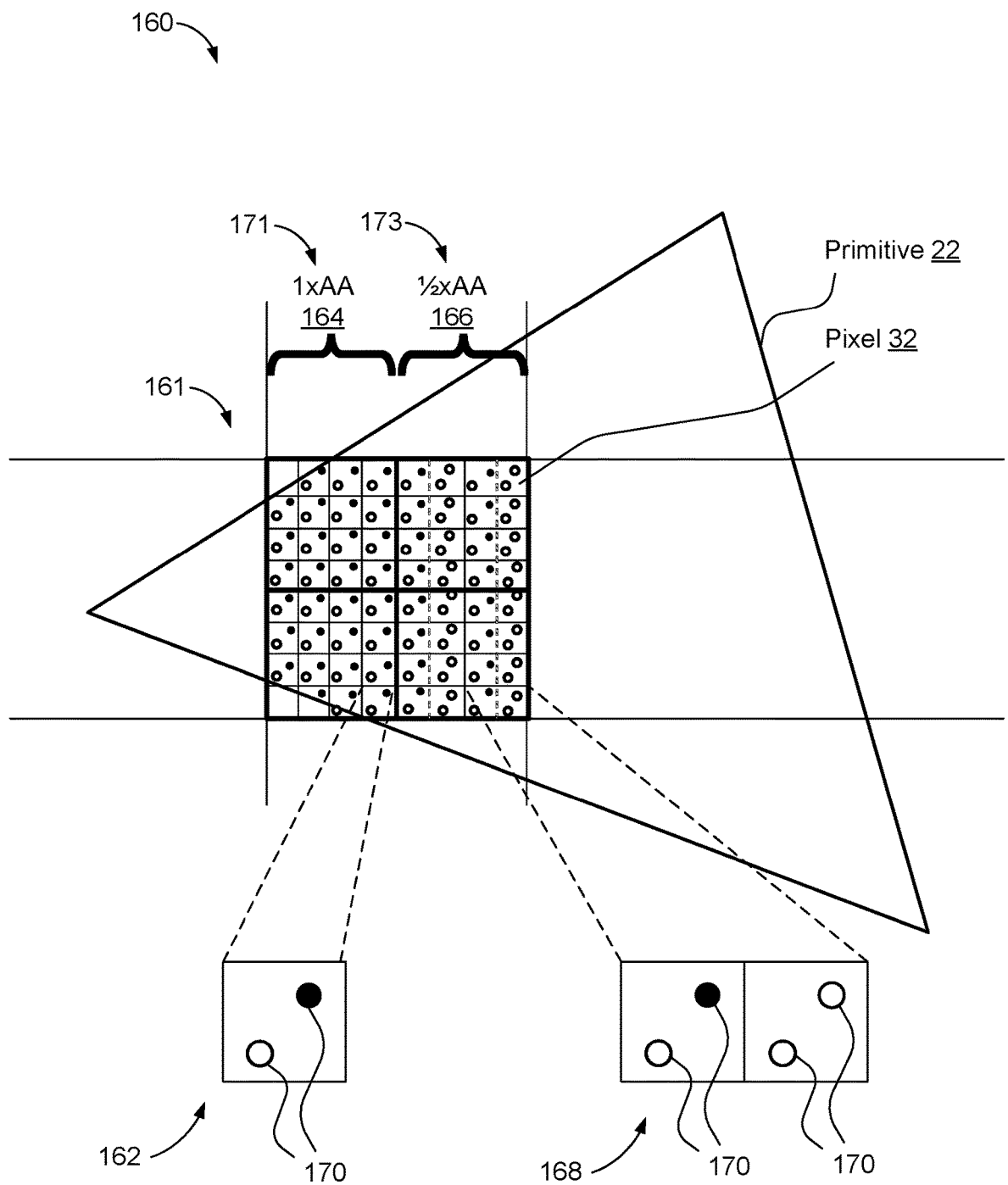
FIG. 8 is a graph of an example of anti-aliasing (AA) to which the described examples can be applied.

In an example, referring to graph 160 of FIG. 8, an example of a MSAA of a primitive 22 is shown. In this example, the maximum AA for GPU 12 (and thus the configuration of a corresponding render target 44) is set for 2×AA. As such, with this setting, there are a maximum of 2 coverage samples (e.g., represented as a hollow circle and a black circle) evaluated per pixel 32 everywhere over the scan by rasterizer stage 94, and 2 bits are passed per pixel 32 in a coverage mask.

As such, out of the 8×8 sub-tile grid of pixels 161, the leftmost 4×8 pixels 164 of T2 have pixel shading done at 1×AA based on pixel shader parameters for that region of T2. For the tile T2, 58 of the total possible 64 samples are covered; also, 30 of the 32 pixels (e.g., as represented by pixel 162) will be launched for shading (e.g., based on the color samples represented by the black circles) by the target sample position. For each of the 30 launched pixel shader threads, two coverage bits 170 can be sent.

In contrast, for the rightmost 4×8 sub-tile grid of pixels 166, shading is done at ½×AA rate (2 wide by 1 high) based on the pixel shader parameters for that region, and four coverage bits 170 can be sent for each of the 16 threads (corresponding to respective pairs of pixels 168) launched for shading. Thus, the operation of the described examples on the rightmost 4×8 pixels may result in substantial graphics processing savings. For instance, in this case, the rightmost 4×8 sub-tile grid of pixels 166 may be considered one of one or more fragments within a particular region, wherein the one or more fragments comprise one color per multiple pixels and have a sample coverage mask for all of the samples belonging to the multiple pixels.

It should be noted that, in other cases, there may be a particular region having one or more fragments comprising one color per tile and a sample coverage mask for all samples belonging to the pixels belonging to the tile.

In an example, examples described above can be applied to the AA configuration based on the rasterizer stage 94 packing thread vectors with pixels or coverage bits corresponding to the pixels for applying shading of the tile based on the corresponding AA rate.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device (e.g., computer device 10), which can be a wired device or a wireless device. Such devices may include, but are not limited to, a gaming device or console, a laptop computer, a tablet computer, a personal digital assistant, a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various examples or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, the ASIC may reside in a computer device (such as, but not limited to, a game console). In the alternative, the processor and the storage medium may reside as discrete components in a user terminal. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present disclosure have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A method of rendering graphics in a computer device, comprising:
   receiving, at a graphics processing unit (GPU), a memory location address of a given portion of a primitive to be rendered along with an indication of one or more values of one or more pixel shader parameters for the same portion of the primitive;
   selecting, by the GPU, multiple pixel shaders from a plurality of possible pixel shaders based on the indication of the one or more values of the one or more pixel shader parameters; and
   generating, by the GPU, and based on concurrently executing each of the multiple pixel shaders by applying each of the multiple pixel shaders to the same portion of the primitive, outputs to multiple render targets of the same portion of the primitive.

2. The method of claim 1, further comprising exporting the at least one of the multiple outputs to the multiple render targets for rendering the same portion of the primitive.

3. The method of claim 1, wherein exporting the at least one of the multiple outputs comprises selecting samples from each of the multiple outputs to output to the multiple render targets.

4. The method of claim 1, wherein exporting the at least one of the multiple outputs comprises exporting at least two of the multiple outputs as separate render targets.

5. A method of rendering graphics in a computer device, comprising:
   receiving, at a graphics processing unit (GPU), a memory location address of a given portion of a primitive to be rendered along with an indication of one or more values of one or more pixel shader parameters for the same portion of the primitive;
   selecting, by the GPU, a pixel shader from a plurality of possible pixel shaders based on the indication of the one or more values of the one or more pixel shader parameters, wherein the one or more pixel shader parameters includes a shading rate;
   generating, by the GPU, at least one output to a render target of the same portion of the primitive based on applying the pixel shader to the same portion of the primitive;
   generating, by the GPU, one or more additional outputs to one or more additional render targets of the same portion of the primitive based on applying the pixel shader, using one or more different values of the one or more pixel shader parameters, to the same portion of the primitive; and
   exporting samples from the render target and at least a portion of the one or more additional render targets for rendering the same portion of the primitive.

6. The method of claim 5, wherein the indication is a value including a first portion of bits that indicate the memory location address of the same portion of the primitive and a second portion of bits that indicate the one or more values of the one or more pixel shader parameters.

7. The method of claim 5, wherein the one or more pixel shader parameters include an indication of a stencil from a stencil buffer.

8. The method of claim 5, further comprising receiving, at the GPU, multiple memory location addresses of portions of the primitive to be rendered along with the indication of the one or more values of the one or more pixel shader parameters, wherein the multiple memory location addresses comprise memory location addresses of multiple thread vectors on which to apply the pixel shader.

9. The method of claim 8, further comprising packing the multiple thread vectors as a list of memory location addresses to be associated with the indication of the one or more values of the one or more pixel shader parameters.

10. The method of claim 5, further comprising:
receiving, at the GPU, a second memory location address of a different portion of the primitive to be rendered along with an indication of a different one or more values of the one or more pixel shader parameters for the different portion of the primitive;
initializing, by the GPU, a different pixel shader based on the indication of the different one or more values of the one or more pixel shader parameters; and
generating, by the GPU and concurrently with generating the at least one output to the render target, at least one different output to a different render target of the different portion of the primitive based on applying the different pixel shader to the different portion of the primitive.

11. The method of claim 5, further comprising:
allocating, by the GPU, a plurality of memory registers for the plurality of possible pixel shaders prior to selecting the pixel shader, wherein the plurality of memory registers correspond to a maximum number of registers specified by one of the plurality of possible pixel shaders; and
deallocating, prior to generating the at least one output, a first portion of the plurality of memory registers based on determining that the selected pixel shader uses a second portion of the plurality of memory registers.

12. The method of claim 11, further comprising initializing, by the GPU and prior to selecting the pixel shader, the plurality of possible pixel shaders.

13. The method of claim 5, wherein the multiple values of the one or more pixel shader parameters correspond to shading rates for the same portion of the primitive.

14. The method of claim 5, wherein generating, by the GPU, the at least one output to the render target comprises modifying one or more pixels of the at least one output to the render target based on applying the pixel shader to the same portion of the primitive using one or more other values for the one or more pixel shader parameters.

15. A computing device, comprising:
a memory;
a processor coupled to the memory and configured to execute instructions corresponding to one or more applications;
a display for displaying one or more images produced by the one or more applications;
a graphics processing unit (GPU) configured to render one or more primitives of the one or more images, wherein the GPU is configured to:
receive a memory location address of a given portion of a primitive of the one or more primitives to be rendered along with an indication of one or more values of one or more pixel shader parameters for the same portion of the primitive;
select a pixel shader from a plurality of possible pixel shaders based on the indication of the one or more values of the one or more pixel shader parameters, wherein the one or more pixel shader parameters includes a shading rate;
generate at least one output to a render target of the same portion of the primitive based on applying the pixel shader to the same portion of the primitive;
generate one or more additional outputs to one or more additional render targets of the same portion of the primitive based on applying the pixel shader, using one or more different values of the one or more pixel shader parameters, to the same portion of the primitive; and
export samples from the render target and at least a portion of the one or more additional render targets for rendering the same portion of the primitive.

16. The computing device of claim 15, wherein the indication is a value including a first portion of bits that indicate the memory location address of the same portion of the primitive and a second portion of bits that indicate the one or more values of the one or more pixel shader parameters.

17. The computing device of claim 15, wherein the GPU is further configured to receive multiple memory location addresses of portions of the primitive to be rendered along with the indication of the one or more values of the one or more pixel shader parameters, wherein the multiple memory location addresses comprise memory location addresses of multiple thread vectors on which to apply the pixel shader.

18. The computing device of claim 15, wherein the one or more pixel shader parameters include an indication of a stencil from a stencil buffer.

* * * * *